United States Patent
Wu

(10) Patent No.: US 12,388,486 B2
(45) Date of Patent: Aug. 12, 2025

(54) SUPPORTING MULTIPLE PROTOCOLS WITH SELECTIVE AMPLIFICATION

(71) Applicant: Google LLC, Mountain View, CA (US)

(72) Inventor: Der-Woei Wu, Mountain View, CA (US)

(73) Assignee: Google LLC, Mountain View, CA (US)

(*) Notice: Subject to any disclaimer, the term of this patent is extended or adjusted under 35 U.S.C. 154(b) by 464 days.

(21) Appl. No.: 17/995,438

(22) PCT Filed: Apr. 7, 2020

(86) PCT No.: PCT/US2020/027094
§ 371 (c)(1),
(2) Date: Oct. 4, 2022

(87) PCT Pub. No.: WO2021/206697
PCT Pub. Date: Oct. 14, 2021

(65) Prior Publication Data
US 2023/0170930 A1    Jun. 1, 2023

(51) Int. Cl.
*H04B 1/48* (2006.01)
*H04B 1/00* (2006.01)

(52) U.S. Cl.
CPC ............. *H04B 1/48* (2013.01); *H04B 1/0057* (2013.01)

(58) Field of Classification Search
CPC .... H04B 1/005; H04B 1/0053; H04B 1/0057; H04B 1/006; H04B 1/0064; H04B 1/38; H04B 1/40; H04B 1/401; H04B 1/406; H04B 1/48
See application file for complete search history.

(56) References Cited

U.S. PATENT DOCUMENTS

| | | | |
|---|---|---|---|
| 8,625,566 B1 | 1/2014 | Husted et al. | |
| 8,780,872 B1 | 7/2014 | Ramamurthy et al. | |
| 8,923,780 B2 | 12/2014 | Ojo et al. | |
| 10,050,679 B2 * | 8/2018 | Rivière | H04B 1/406 |

(Continued)

FOREIGN PATENT DOCUMENTS

| | | |
|---|---|---|
| CN | 101427518 A | 5/2009 |
| CN | 106067827 A | 11/2016 |

(Continued)

OTHER PUBLICATIONS

"Foreign Office Action", CN Application No. 202080099390.6, Aug. 26, 2024, 22 pages.

(Continued)

*Primary Examiner* — Quochien B Vuong
(74) *Attorney, Agent, or Firm* — Colby Nipper PLLC

(57) ABSTRACT

This disclosure describes apparatuses, methods, and techniques for supporting multiple protocols with selective amplification, such as 5 GHz Wi-Fi®, 2.4 GHz Wi-Fi®, 2.4 GHz Bluetooth Classic®, 2.4 GHz BLE®, and/or 2.4 GHz IEEE 802.15.4 (e.g., Thread® or ZigBee®) protocols. In more detail, the disclosure describes a multi-protocol transceiver system that includes a front-end architecture, which enables the multi-protocol transceiver system to transmit and receive the wireless communication signals according to the multiple protocols. The multi-protocol transceiver system may utilize one or more antennas to transmit and receive the multiple protocols.

15 Claims, 11 Drawing Sheets

(56) References Cited

U.S. PATENT DOCUMENTS

| | | | |
|---|---|---|---|
| 10,772,052 B2 * | 9/2020 | O'Shea | H04B 1/406 |
| 10,778,178 B2 * | 9/2020 | Ghim | H04B 1/006 |
| 11,949,389 B2 * | 4/2024 | Arkiszewski | H04B 1/0064 |

FOREIGN PATENT DOCUMENTS

| | | |
|---|---|---|
| CN | 108322450 A | 7/2018 |
| EP | 1931052 | 5/2012 |
| WO | 2021206697 | 10/2021 |

OTHER PUBLICATIONS

"International Preliminary Report on Patentability", Application No. PCT/US2020/027094, Oct. 6, 2022, 11 pages.
"International Search Report and Written Opinion", PCT Application No. PCT/US2020/027094, Dec. 21, 2020, 16 pages.
"Foreign Office Action", EP Application No. 20722164.9, Jan. 14, 2025, 7 pages.

* cited by examiner

SUPPORTING MULTIPLE PROTOCOLS WITH SELECTIVE AMPLIFICATION

RELATED APPLICATION(S)

This application is a national stage entry of International Application No. PCT/US2020/027094, filed Apr. 7, 2020, the disclosure of which is incorporated herein by reference in its entirety.

BACKGROUND

Many user devices enable wireless communication with other user devices following various different communication protocols, such as a 5 gigahertz (GHz) Wi-Fi® protocol, a 2.4 GHz Wi-Fi® protocol, a 2.4 GHz Bluetooth Classic® or a 2.4 GHz Bluetooth Low Energy® (BLE®) protocol, as well as other protocols and standards established and maintained by various industry and academia consortiums and organizations, such as the Institute of Electrical and Electronics Engineers (IEEE communication standards (e.g., IEEE 802.15.4).

With increased interconnectivity between multiple devices that, at times, is fueled by the popularity of Internet-of-Things (IoT) devices, some manufacturers have integrated multiple transceivers that may be embedded in or on different system-on-chips (SoCs) that enable multi-protocol communication. Using these solutions, the manufacturers can, for example, utilize a first transceiver embedded in or on a first SoC to transmit and receive wireless communication signals according to 5 GHz Wi-Fi®, the 2.4 GHz Wi-Fi®, and/or the 2.4 GHz Bluetooth Classic® protocols. In addition, the manufacturers can utilize a second transceiver embedded in or on a second SoC to transmit and receive wireless signals according to 2.4 GHz BLE and/or the 2.4 GHz IEEE 802.15.4 protocols. The solution of integrating various transceivers that may be embedded in or on various SoCs involves coordination before transmitting or receiving a wireless communication signal utilizing the first SoC or the second SoC. To do so, manufacturers may utilize a Packet Traffic Arbitration (PTA) coexistence architecture (e.g., a 2-wire PTA, a 3-wire PTA, or a 4-wire PTA) to coordinate wireless communication signals that are supported by the first or the second SoC. The 3-wire PTA coexistence architecture supports a wired communication protocol between various transceivers according to communication protocol outlined in the IEEE 802.15.2 standard. Although the use of the 3-wire PTA coexistence architecture enables the integration of various transceivers into one user device, the 3-wire PTA coexistence architecture can be a bottleneck to the number of protocols permitted to be communicated at a same time interval.

To illustrate this bottleneck in data transfer when utilizing the 3-wire PTA coexistence architecture, consider a device with a first transceiver that may be embedded in or on a first SoC to communicate a wireless communication signal according to the 2.4 GHz Wi-Fi® protocol. The device has a second transceiver that may be embedded in or on a second SoC to communicate wireless communication signals according to the 2.4 GHz BLE® and/or the 2.4 GHz IEEE 802.15.4 protocols. To do so, initially the second SoC, using the 3-wire PTA coexistence architecture, sends a "request" signal to the first SoC. Then, the second SoC sends a "priority" signal to the first SoC. Then, the first SoC that supports the 2.4 GHz Wi-Fi® protocol can send a "grant" signal to the second SoC. Finally, the second SoC can be utilized to transmit or receive wireless communication signals according to the 2.4 GHz BLE® and/or the 2.4 GHz IEEE 802.15.4 protocols. Note that in some instances, the first SoC may not send the "grant" signal to the second SoC. Subsequently, in some instances, the second SoC cannot be utilized to transmit or receive wireless communication signals according to the 2.4 GHz BLE® and/or the 2.4 GHz IEEE 802.15.4 protocols. The packet-traffic-arbitration communication protocol between the first SoC and the second SoC is one reason behind the bottleneck, as it limits the number of protocols permitted to be communicated at a same time interval. Further, in some instances, the packet-traffic-arbitration communication can block some protocols (e.g., the 2.4 GHz IEEE 802.15.4 protocols) from being transmitted or received.

SUMMARY

This disclosure describes apparatuses, methods, and techniques for supporting multiple protocols with selective amplification, such as 5 GHz Wi-Fi®, 2.4 GHz Wi-Fi®, 2.4 GHz Bluetooth Classic®, 2.4 GHz BLE®, and/or 2.4 GHz IEEE 802.15.4 (e.g., Thread® or ZigBee®) protocols. In more detail, the disclosure describes a multi-protocol transceiver system that includes a front-end architecture, which enables the multi-protocol transceiver system to transmit and receive the wireless communication signals according to the multiple protocols. The multi-protocol transceiver system may utilize one or more antennas to transmit and receive the multiple protocols.

In one aspect, the disclosure describes an apparatus for supporting multiple protocols with selective amplification. The apparatus includes multiple amplification circuits associated with different types of wireless communication signals having different protocols or different frequencies, where each amplification circuit of the multiple amplification circuits is configured to selectively operate in a transmission state to amplify a particular type of wireless communication signal of the different types of wireless communication signals for transmission. In addition, each amplification circuit can operate in a reception state to amplify the particular type of wireless communication signal for reception. The apparatus includes a controller to selectively enable two or more amplification circuits of the multiple amplification circuits to operate during a same time interval to enable independent and concurrent communication of two or more types of wireless communication signals of the different types of wireless communication signals.

In another aspect, the disclosure describes a system that includes multiple amplification means associated with different types of wireless communication signals having different protocols or different frequencies. Each amplification means of the multiple amplification means is configured to selectively operate in a transmission state to amplify a particular type of wireless communication signal of the different types of wireless communication signals for transmission. Alternatively, each amplification means of the multiple amplification means is configured to selectively operate in a reception state to amplify the particular type of wireless communication signal for reception. The system also includes control means for selectively enabling two or more amplification means of the multiple amplification means to operate during a same time interval to enable independent and concurrent communication of two or more types of wireless communication signals of the different types of wireless communication signals.

In another aspect, the disclosure describes a method to support multiple protocols with selective amplification by selectively enabling a first amplification circuit of multiple amplification circuits and a second amplification circuit of the multiple amplification circuits to operate during a same time interval. Then, the method includes amplifying, using the first amplification circuit, a first wireless communication signal of a first type, the first type associated with a first protocol and a first frequency. Further, the method includes amplifying, using the second amplification circuit, a second wireless communication signal of a second type, the second type associated with a second protocol and a second frequency. The method further includes independently and concurrently communicating the first wireless communication signal and the second wireless communication signal.

In yet another aspect, the disclosure describes a system having one or more transceivers, a multiplexing circuit, multiple amplification circuits, and a controller that is configured to selectively enable two or more amplification circuits of the multiple amplification circuits to perform the method mentioned above.

This summary describes supporting multiple protocols with selective amplification, which are further described below in the Detailed Description. For ease of description and sake of clarity, the disclosure references transmitting and receiving 5 GHz Wi-Fi®, 2.4 GHz Wi-Fi®, 2.4 GHz Bluetooth Classic®, 2.4 GHz BLE®, and/or 2.4 GHz IEEE 802.15.4 (e.g., Thread® or ZigBee®) protocols. The same concepts may be used to transmit and receive various other radio signals, wireless signals, wireless communication signals, wireless communication protocols, and so forth. This summary is not intended to identify exhaustive features of the claimed subject matter, nor is it intended for use in determining the scope of the claimed subject matter.

BRIEF DESCRIPTION OF THE DRAWINGS

The details of one or more aspects of apparatuses, methods, and techniques for supporting multiple protocols with selective amplification are disclosed. The same numbers are used throughout the drawings to reference like features and components:

FIG. 3-1 illustrates transmission and reception of the multiple protocols between a front-end architecture of the multi-protocol transceiver system and two antennas.

FIG. 3-2 illustrates a first configuration of the front-end architecture of FIG. 3-1.

FIG. 3-3 illustrates a second configuration of the front-end architecture of FIG. 3-1.

FIG. 3-4 illustrates a third configuration of the front-end architecture of FIG. 3-1.

FIG. 3-5 illustrates a fourth configuration of the front-end architecture of FIG. 3-1.

FIG. 4-1 illustrates transmission and reception of the multiple protocols between the front-end architecture of the multi-protocol transceiver system and one antenna.

FIG. 4-2 illustrates a configuration of the multi-protocol transceiver system of FIG. 4-1 that can simultaneously receive multiple protocols of a same frequency.

FIG. 5 illustrates an example method, performed by a device, for supporting multiple protocols with amplification via a first and a second amplification circuit.

DETAILED DESCRIPTION

Overview

The described multi-protocol transceiver system includes a front-end architecture that obviates the need for a 3-wire PTA coexistence architecture to coordinate the transmission and reception of the wireless communication signals according to the multiple protocols. Hence, the described multi-protocol transceiver system reduces the bottleneck of data transferring at a same time interval that exists when using a conventional solution, as explained in detail below.

Example Environments

Figure 1:
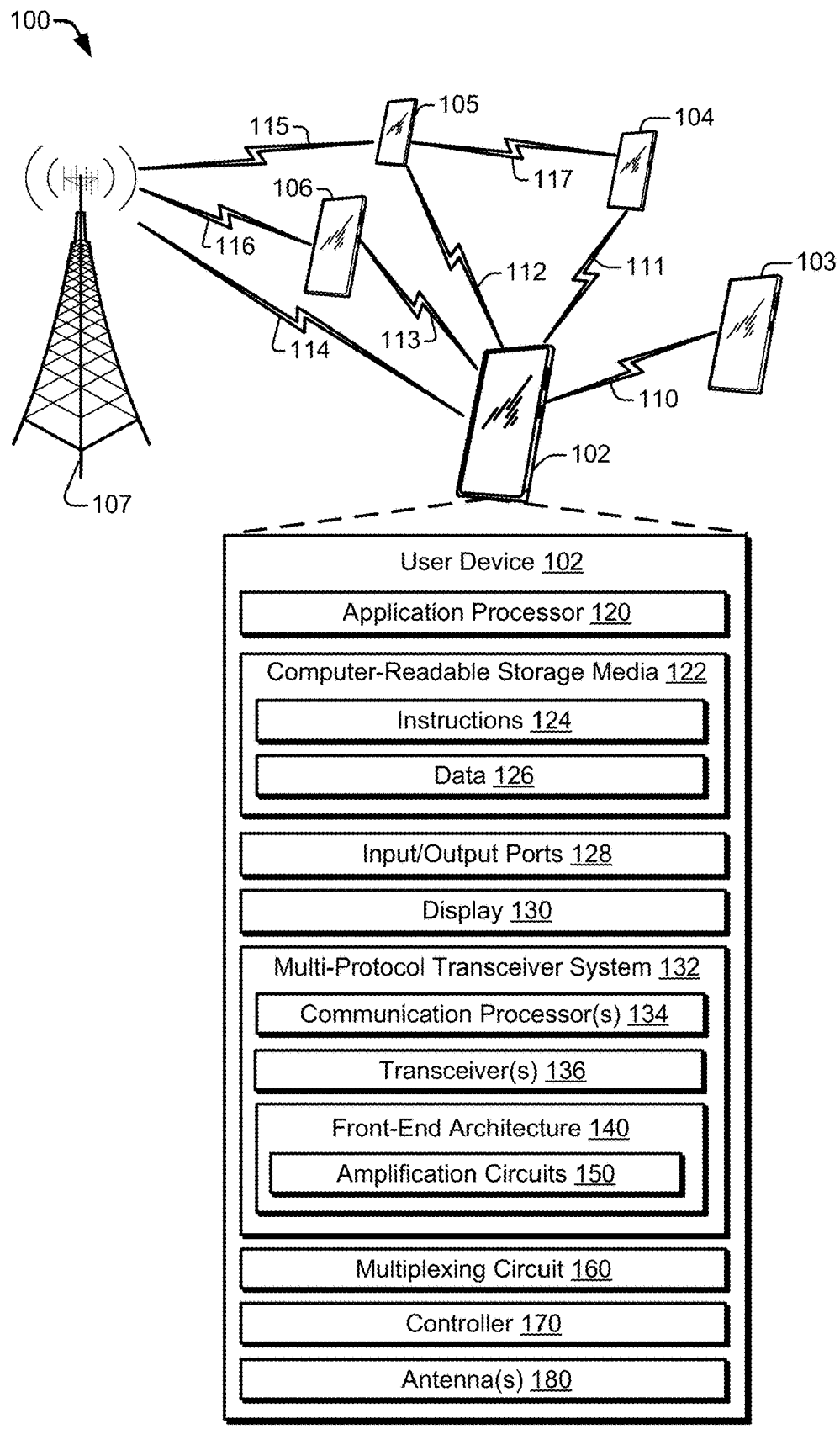
FIG. 1 is a partial schematic, partial block diagram of an example environment, illustrating a device that supports multiple protocols with selective amplification.

FIG. 1 is a partial schematic, partial block diagram of an example environment 100, illustrating a user device 102 (e.g., user equipment) that supports multiple protocols with selective amplification. The user device 102 communicates wirelessly with a user device 103 according to a first protocol, with a user device 104 according to a second protocol, with a user device 105 according to a third protocol, and with a user device 106 according to a fourth protocol. For clarity and ease of description, in FIG. 1, the first protocol is a 5 GHz Wi-Fi® protocol and is illustrated with a wireless link 110 between the user devices 102 and 103. The second protocol is a 2.4 GHz Wi-Fi® protocol and is illustrated as a wireless link 111 between user devices 102 and 104. The third protocol is a 2.4 GHz Bluetooth Classic® or 2.4 GHz BLE® protocol and is illustrated as a wireless link 112 between user devices 102 and 105. Lastly, in FIG. 1, the fourth protocol is a 2.4 GHz IEEE 802.15.4 (e.g., Thread® or ZigBee®) protocol and is illustrated as a wireless link 113 between the user devices 102 and 106.

Further, in the example environment 100, some or all the illustrated user devices may also communicate with one or more base stations (illustrated as base station 107). The base station 107 may communicate with the user device 102 using a wireless link 114, with the user device 105 using a wireless link 115, and the user device 106 using a wireless link 116. The wireless links 114, 115, and 116 may include control and data communication, such as downlink of data and control information communicated from the base station 107 to the user devices 102, 105, and 106, uplink of other data and control information communicated from the user devices 102, 105, and 106 to the base station 107, or both. Also, the wireless links 114, 115, and 116 may include one or more wireless links (e.g., radio links) or bearers implemented using any suitable communication protocol or standard, or combination of protocols or standards, such as 3rd Generation Partnership Project Long-Term Evolution (3GPP LTE), 5th Generation New Radio (5G NR), and so forth. Alternatively, the user devices 102, 105, and 106 may utilize wired (instead of wireless) communication (e.g., using a digital subscriber line (DSL)) to uplink or downlink data to a wide area network (WAN) (e.g., the Internet) and/or other types of networks.

The user device 102 illustrated in FIG. 1 may be considered a coordinating user device that transmits to and receives from multiple wireless communication signals according to multiple protocols to and from multiple user devices, such as user devices 103, 104, 105, 106, and the base station 107. Alternatively or in addition to, some or all other user devices that are illustrated in FIG. 1 can also operate as coordinating user devices. For example, the user device 104 can also communicate with the user device 105 using a wireless link 117 according to any protocol, such as 5 GHz Wi-Fi®, 2.4 GHz Wi-Fi®, 2.4 GHz Bluetooth Classic®, 2.4 GHz BLE®, IEEE 802.15.4 (e.g., Thread® or ZigBee®), and so forth.

For ease of description and the sake of clarity, this disclosure focuses on the user device 102 and the wireless communication between the user device 102 and other user devices (e.g., 103, 104, 105, and 106). The user device 102 may be any mobile or non-mobile device. As a mobile device, the user device 102 can be a mobile phone (e.g., a smartphone), a laptop computer, a wearable device (e.g., watches, eyeglasses, headphones, clothing), a tablet device, an automotive/vehicular device, a portable gaming device, an electronic reader device, or a remote-control device, or other mobile computing device that transmits and receives one or more wireless communication signals according to multiple protocols, such as 5 GHz Wi-Fi®, 2.4 GHz Wi-Fi®, Bluetooth Classic®, BLE®, and IEEE 802.15.4 (e.g., Thread® or ZigBee®) protocols. As a non-mobile device, the user device 102 may represent a server, a network terminal device, a desktop computer, a television device, a display device, an entertainment set-top device, a streaming media device, a tabletop assistant device, a non-portable gaming device, business conferencing equipment, a payment station, or other non-mobile computing device capable of communicating wirelessly according to multiple protocols.

The user device 102 includes one or more application processors (illustrated as application processor 120) and one or more computer-readable storage media (CRM 122). The application processor 120 may include any combination of one or more controllers, microcontrollers, processors, microprocessors, hardware processors, hardware processing units, digital signal processors, graphics processors, graphics processing units, and the like. The application processor 120 processes computer-executable instructions 124 (e.g., code) stored by the CRM 122. The CRM 122 may include any suitable memory media and storage media, such as volatile memory (e.g., random-access memory (RAM)), non-volatile memory (e.g., Flash memory), optical media, magnetic media (e.g., disk or tape), and so forth. As is illustrated in FIG. 1, the CRM 122 may store instructions 124, data 126, and/or other information (not illustrated), and the CRM 122 excludes propagating signals.

The user device 102 may also include one or more input/output ports 128 (I/O ports 128) and/or at least one display 130 that may present graphical images provided by the user device 102 and may aid a user to interact with the user device 102. Examples (not illustrated) of I/O ports 128 are: Secure Digital Input/Output (SDIO), General Purpose Input/Output (GPIO), Serial Peripheral Interface (SPI), Pulse-Code Modulation (PCM), Universal Asynchronous Receiver-Transmitter (UART), and so forth.

The user device 102 can communicate with other devices (e.g., user devices 103, 104, 105, and 106) using a multi-protocol transceiver system 132. The multi-protocol transceiver system 132 can be implemented in one or more SoCs. The multi-protocol transceiver system 132 may include one or more communication processors (communication processor(s) 134), one or more transceivers (transceiver(s) 136), a multiplexing circuit 160, and one or more antennas (antenna(s) 180), to transmit and receive multiple wireless communication signals according to multiple protocols.

Generally speaking, the multi-protocol transceiver system 132 may include various quantities of communication processors 134 and various quantities of transceiver 136, which can include various quantities of transmitters and receivers that jointly support bi-directional wireless communication signals according to the 5 GHz Wi-Fi®, 2.4 GHz Wi-Fi®, 2.4 GHz Bluetooth Classic®, 2.4 GHz BLE®, and/or 2.4 GHz IEEE 802.15.4 protocols. The transceivers 136 may be implemented in or on one or more SoCs, integrated circuits (ICs), radio-frequency integrated circuits (RFICs), mixed-signal ICs, and the like. The transceivers 136 utilize multiple local oscillators (not illustrated), the count of the multiple local oscillators being equal or greater than the count of the multiple protocols. Also, the transceivers 136 can include other signal processing blocks, such as mixers, filters, amplifiers, digital-to-analog (DAC) converters, analog-to-digital (ADC) converters, and so forth. Similarly, the communication processors 134 may be implemented in or on one or more SoCs, ICs, and the like. Also, the communication processors 134 may be implemented on the same SoCs as the transceivers 136 or may be implemented on different SoCs from the transceivers 136. Although not illustrated, it is to be understood that the communication processor(s) 134 can include one or more digital signal processors (DSPs) or other signal-processing blocks for encoding and modulating data for transmission and for demodulating and decoding received data.

The multi-protocol transceiver system 132 includes a front-end architecture 140 that obviates the need for the 3-wire PTA coexistence architecture to coordinate the transmission and reception of wireless communication signals between the user device 102 and other devices (e.g., user devices 103, 104, 105, and 106). The front-end architecture 140 includes amplification circuits 150 that enable the multi-protocol transceiver system 132 of the user device 102 to communicate multiple wireless communication signals according to multiple protocols. To do so, the user device 102 utilizes a controller 170 to dynamically control states of the amplification circuits 150 and a multiplexing circuit 160 to enable independent and concurrent communication of two or more wireless communication signals associated with different protocols.

The controller 170 can include at least one processor and CRM, which stores computer-executable instructions. Together, the processor and associated instructions can be realized in separate circuitry, fixed logic circuitry, hard-coded logic, and so forth. The processor and the CRM of the controller 170 can be localized at one module or one integrated circuit, as is illustrated in FIG. 1. Alternately, the controller 170 can be distributed across multiple modules or chips. Therefore, the controller 170 can be implemented as part of the multi-protocol transceiver system 132, the application processor 120, a general-purpose processor, some combination thereof, and so forth.

In the context of this disclosure, the terms radio, wireless signals, standards, wireless communication protocols, and protocols may be interchangeable. As one example, when the disclosure discusses the ability of the user device 102 to communicate with the user device 106 utilizing the 2.4 GHz IEEE 802.15.4 radio, and the communication between user devices 102 and 106 may be accomplished using the Thread® or the ZigBee® protocol. This is another reason the disclosure discusses the ability of the user device 102 to wirelessly communicate signals according to multiple protocols.

Selective Amplification

Figure 2:
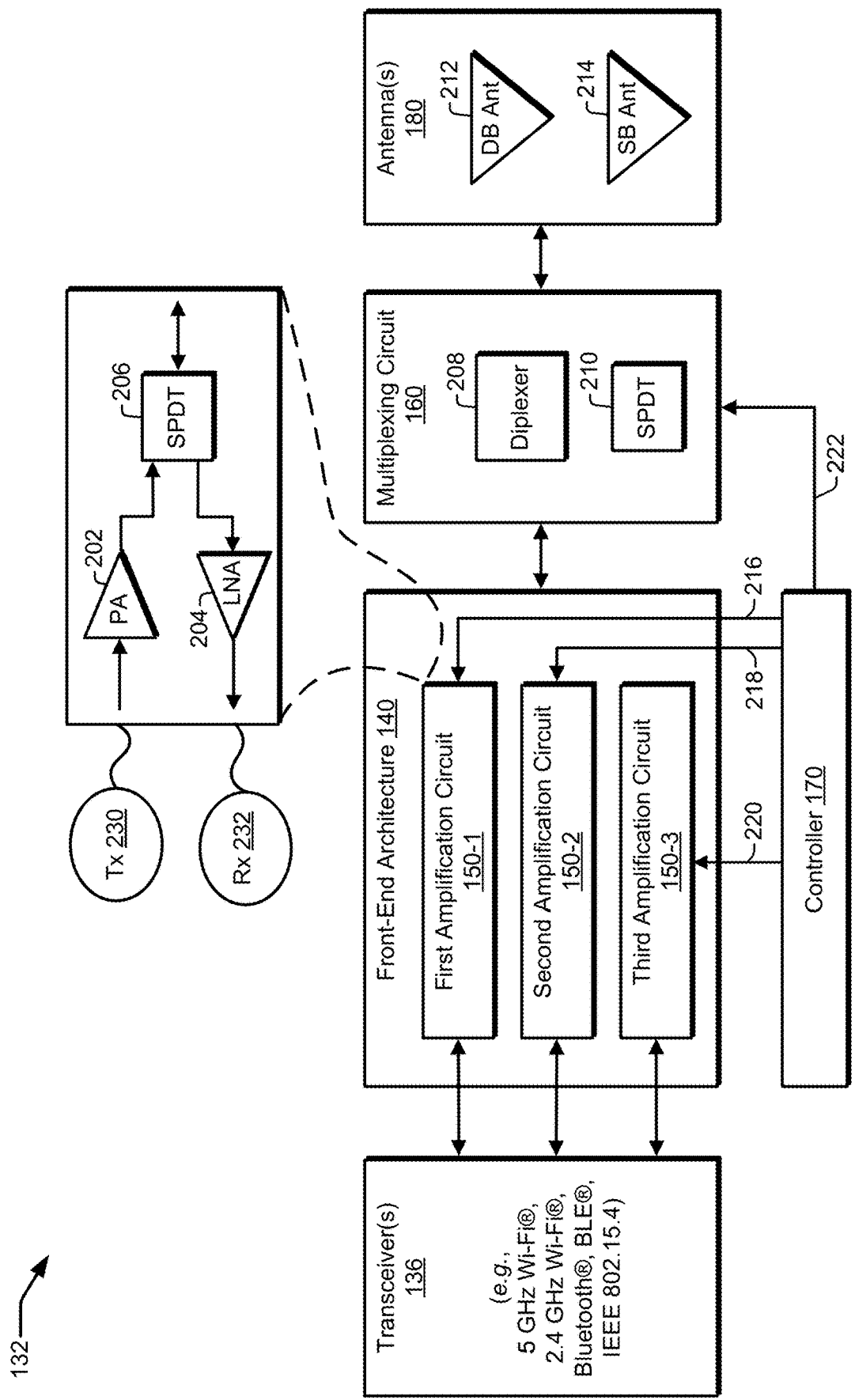
FIG. 2 illustrates an example multi-protocol transceiver system, an example multiplexing circuit, and one or more antennas for transmitting and receiving multiple protocols.

FIG. 2 is a block diagram of an example circuit 132, illustrating transmission and reception of the multiple protocols between the transceiver 136 and the antenna(s) 180. In the depicted configuration, the front-end architecture 140 is coupled to the multiplexing circuit 160, which is coupled to the antenna(s) 180, as is illustrated in FIG. 2. The front-end architecture 140 and the multiplexing circuit 160 enable the transmission and reception of the multiple protocols between the transceiver(s) 136 and the antenna(s) 180. In one aspect, the antenna 180 includes a dual-band antenna 212 (illustrated as DB Ant 212), as further described with respect to FIGS. 4-1 and 4-2. In another aspect, the antennas 180 includes the dual-band antenna 212 and a single-band antenna 214 (illustrated as SB Ant 214), as further described with respect to FIGS. 3-1 to 3-5.

The front-end architecture 140 includes a first amplification circuit 150-1 coupled to the transceivers 136, a second amplification circuit 150-2 coupled to the transceivers 136, and a third amplification circuit 150-3 coupled to the transceivers 136. Although only illustrated for the first amplification circuit 150-1, each of the first, second, and third amplification circuits (150-1, 150-2, and 150-3) include a power amplifier (illustrated as PA 202), a low-noise amplifier (illustrated as LNA 204), and a single-pole double-throw (SPDT) switch (illustrated as SPDT 206). The output of the PA 202 is coupled to a first terminal (throw) of the SPDT 206, and the input of the LNA 204 is coupled to a second terminal (throw) of the SPDT 206.

The SPDT 206 enables each amplification circuit (150-1, 150-2, and 150-3) to be in a transmission state 230 (illustrated as Tx 230) or a reception state 232 (illustrated as Rx 232). In the transmission state 230, the power amplifier 202 is in an on-state and the SPDT 206 connects the power amplifier 202 to the multiplexing circuit 160. In the reception state 232, the low-noise amplifier 204 is in an on-state and the SPDT 206 connects the low-noise amplifier 204 to the multiplexing circuit 160. Both the transmission state 230 and the reception state 232 represent enabled states in which the associated amplification circuit 150-1 to 150-3 provides amplification for transmission or reception, respectively. Although not illustrated in FIG. 2, each amplification circuit 150-1 to 150-3 can also be in a disabled state in which the power amplifier 202 and the low-noise amplifier 204 are in an off-state. In the disabled state, the SPDT 206 can connect the power amplifier 202 or the low-noise amplifier 204 to the multiplexing circuit 160.

The multiplexing circuit 160 includes a diplexer 208, which can be utilized if the multi-protocol transceiver system 132 utilizes the dual-band antenna 212. In some implementations, the multi-protocol transceiver system 132 also includes another single-pole double-throw (SPDT) switch (illustrated as SPDT 210) to enable transmission and reception of the multiple protocols.

To support the various configurations of the multi-protocol transceiver system 132, the controller 170 uses control signals 216, 218, and 220 to respectively enable the amplification circuits 150-1, 150-2, and 150-3 for transmission or reception (Tx 230 or Rx 232). The controller 170 can also use the control signals 216, 218, and 220 to disable the amplification circuits 150-1 to 150-3. Finally, depending on the implementation of the multi-protocol transceiver system 132, the controller 170 can also use a control signal 222 to support configurations of the multiplexing circuit 160, as it is illustrated in FIGS. 4-1 and 4-2.

Example Multiple Antennas Implementation

Figures 1, 3:
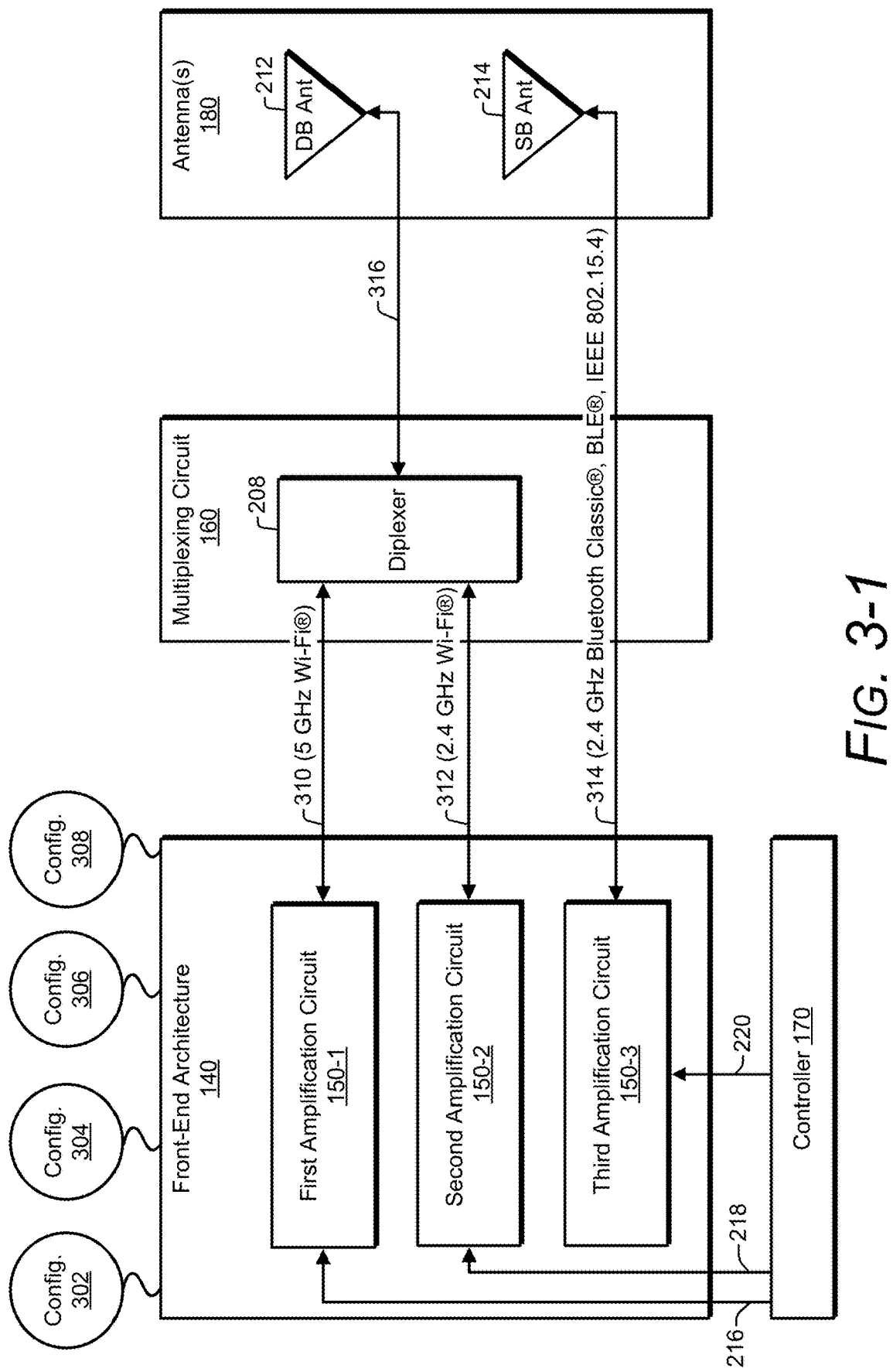
Figures 2, 3:
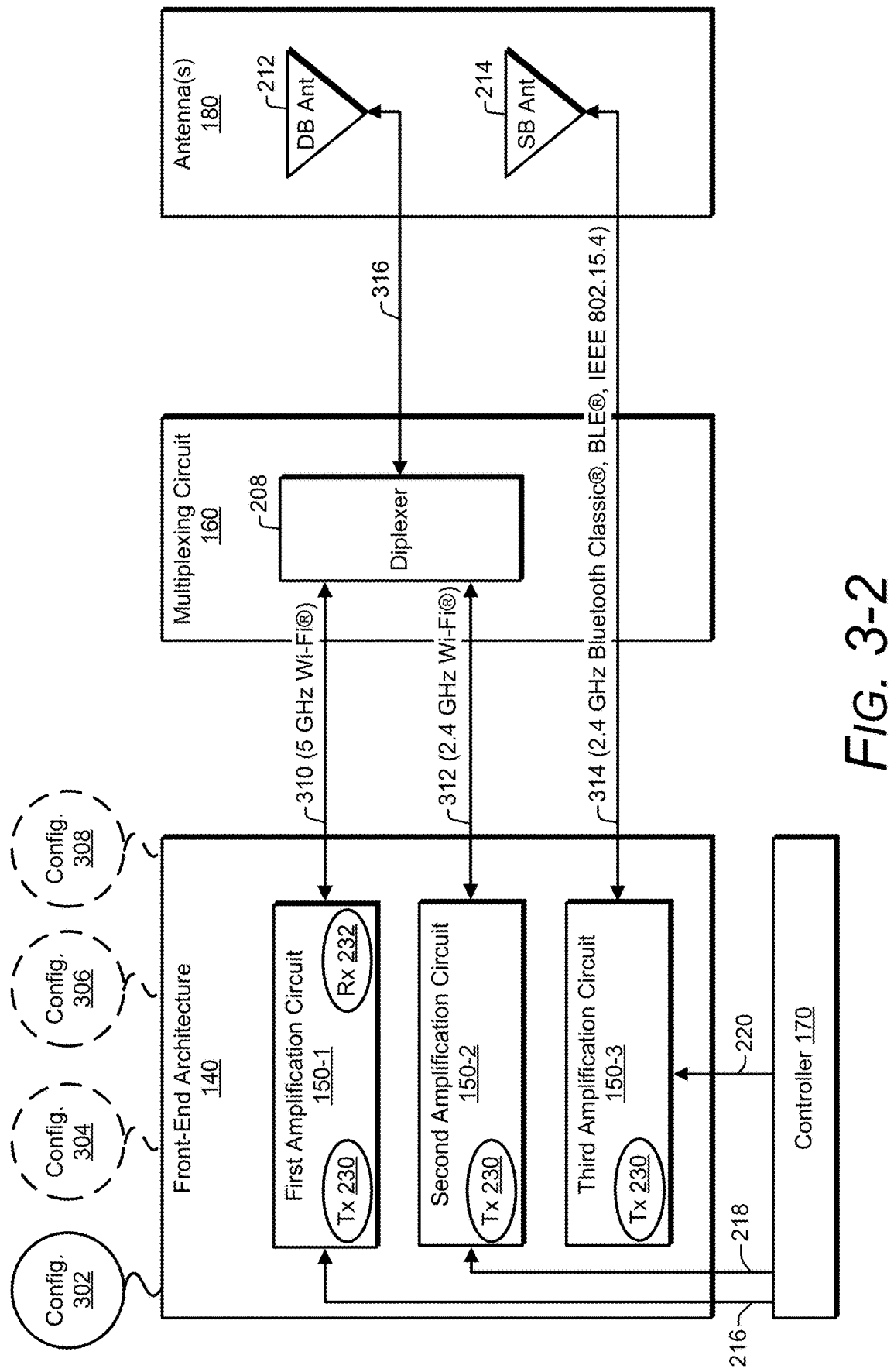
Figure 3:
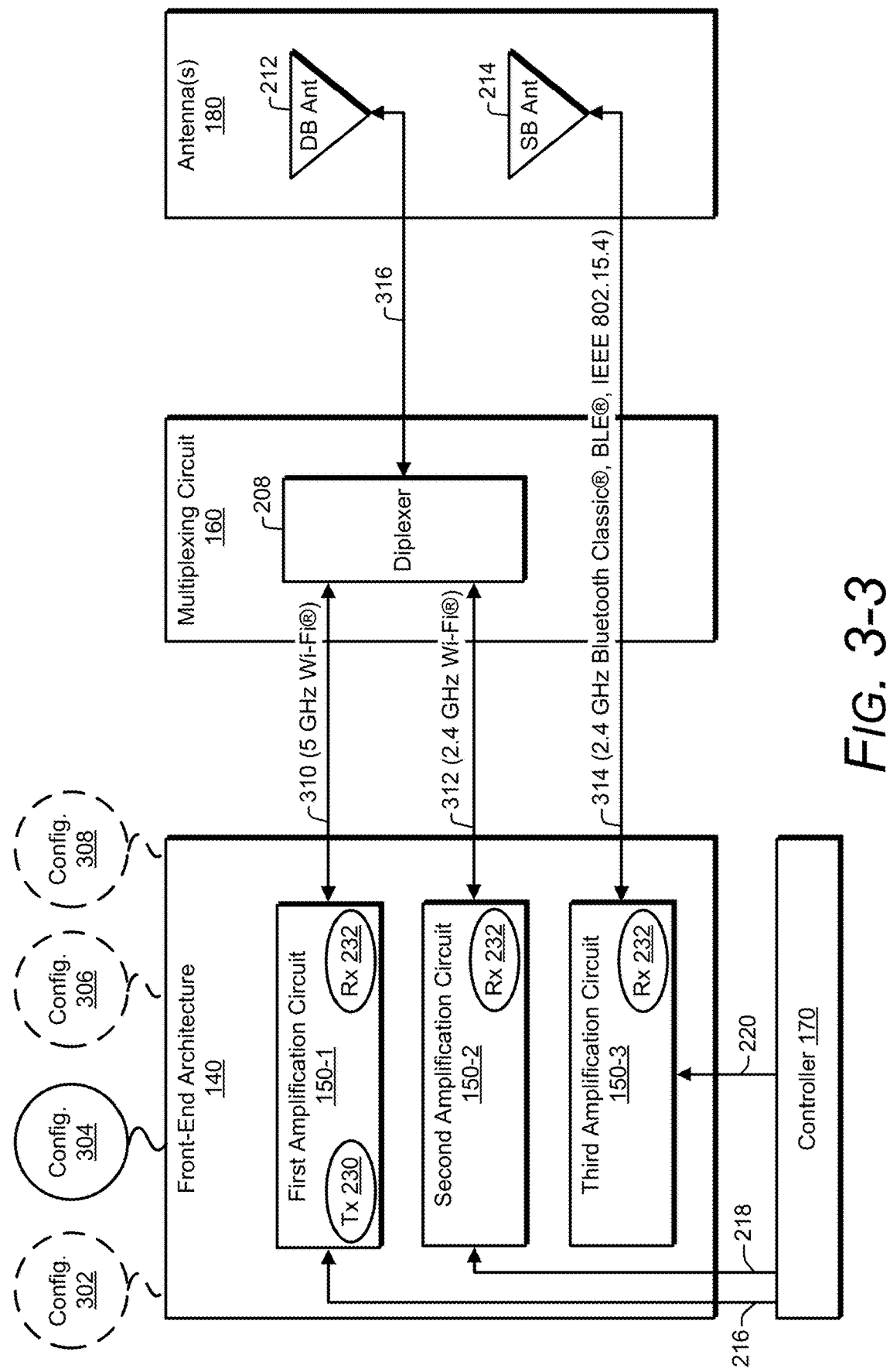
Figures 3, 4:
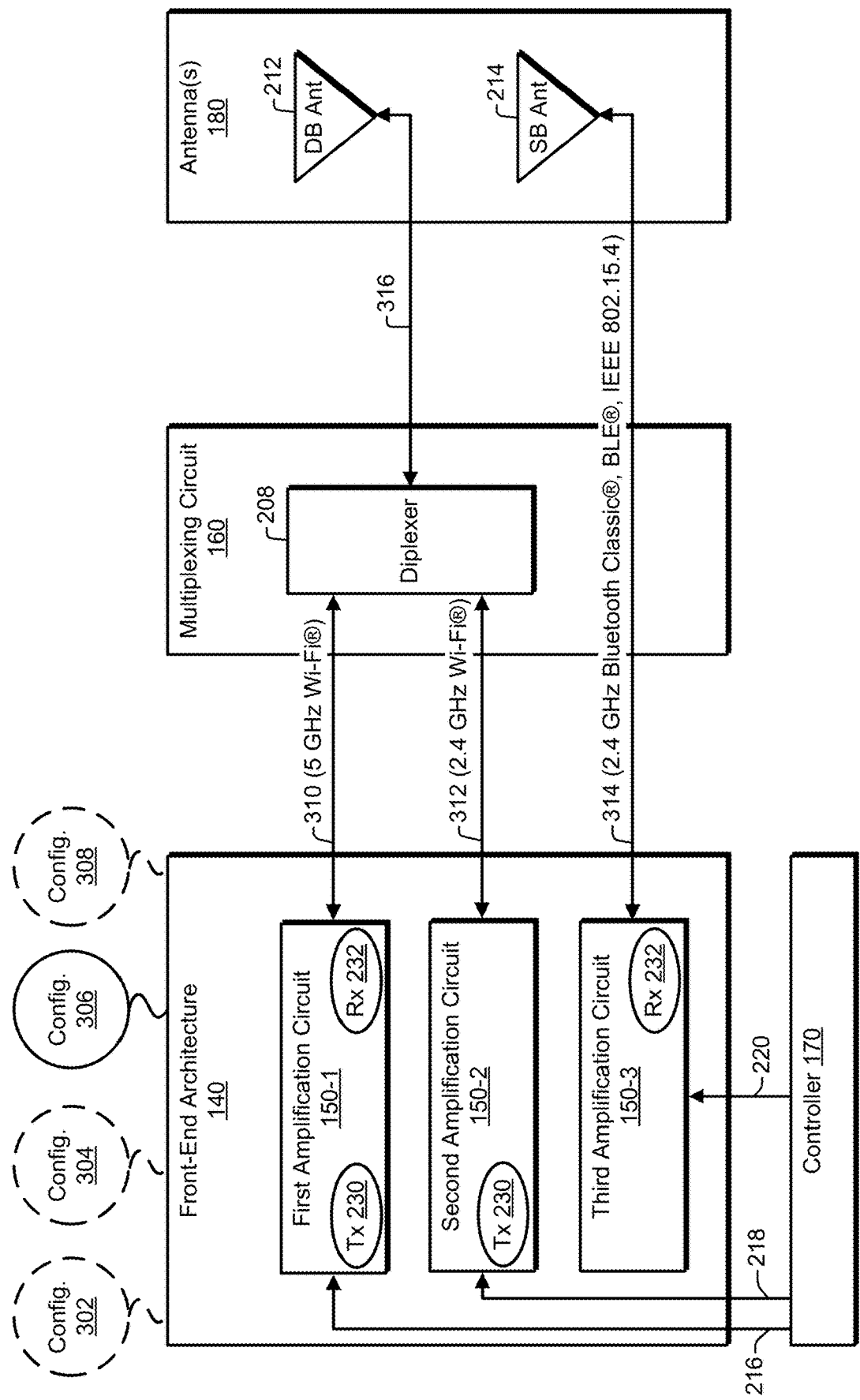

FIG. 3-1 illustrates one aspect of the multi-protocol transceiver system 132 that supports transmission and reception of the multiple protocols between the front-end architecture 140 and two antennas (antenna(s) 180). The antennas 180 includes the dual-band antenna 212 and the single-band antenna 214. Although not illustrated, it is to be understood that the coupling between the transceivers 136 and the front-end architecture 140 can be the same in all aspects described in this disclosure.

In the depicted configuration, the first amplification circuit 150-1 is coupled to a first terminal of the diplexer 208 via transmission and reception path 310 and amplifies wireless communication signals associated with the 5 GHz Wi-Fi® protocol. Alternatively, although not illustrated as such in FIG. 3-1, the first amplification circuit 150-1 can amplify wireless communication signals associated with a 6 GHz Wi-Fi® protocol (e.g., Wi-Fi 6E®). Further, instead of the depicted Single-Input Single-Output (SISO) system illustrated in FIG. 3-1, the first amplification circuit 150-1 can amplify wireless communication signals of a Multiple-Input Multiple-Output (MIMO) system. Note that in the case of the MIMO system, the multiplexing circuit 160 changes to accommodate the number of inputs and outputs of the MIMO system. For example, the count of the diplexers in the multiplexing circuit 160 increases.

As is illustrated in FIG. 3-1, the second amplification circuit 150-2 is coupled to a second terminal of the diplexer 208 via transmission and reception path 312 and amplifies wireless communication signals associated with the 2.4 GHz Wi-Fi® protocol. A third terminal of the diplexer 208 is coupled to the dual-band antenna 212 utilizing transmission and reception path 316 to transmit and receive the 5 GHz Wi-Fi® and the 2.4 GHz Wi-Fi® protocols. Note that the dual-band antenna 212 supports wireless transmission and reception of protocols of two different frequencies, namely 5 GHz and 2.4 GHz. The protocols supported by the first amplification circuit 150-1 and second amplification circuit 150-2 are associated with two frequencies (5 GHz and 2.4 GHz), which enable sharing of the dual-band antenna 212 via the diplexer 208. Space conservation is one advantage of using one dual-band antenna instead of two single-band antennas to receive and transmit the 5 GHz Wi-Fi® and the 2.4 GHz Wi-Fi® protocols.

The multiplexing circuit 160 couples the third amplification circuit 150-3 to the single-band antenna 214 via transmission and reception path 314. The third amplification circuit 150-3 amplifies wireless communication signals associated with 2.4 GHz Bluetooth Classic®, 2.4 GHz BLE®, and/or 2.4 GHz IEEE 802.15.4 (e.g., Thread® or ZigBee®) protocols. In prior solutions, a 3-wire PTA algorithm or a coexistence engine manages the timing and the priority for transmitting and receiving the various wireless communication signals associated with the 2.4 GHz Wi-Fi® protocols. In contrast, the design implementation of FIG. 3-1 can simultaneously and independently communicate the various 2.4 GHz protocols.

Through the control signals 216, 218, and 220, the controller 170 can utilize the design implementation of the multi-protocol transceiver system 132 of FIG. 3-1 using configuration 302, configuration 304, configuration 306, and configuration 308, which are further described with respect to FIGS. 3-2 to 3-5. In FIG. 3-1, the multiplexing circuit 160 includes the diplexer 208 and does not utilize the SPDT 210 illustrated in FIG. 2. Thus, the control signal 222 (of FIG. 2) is not necessary for supporting the different configurations 302 to 308.

Regardless of the configuration of the multi-protocol transceiver system 132, it is to be understood that the multi-protocol transceiver system 132 can transmit or receive the 5 GHz Fi-Fi® protocol, without interfering with the 2.4 GHz protocols (e.g., 2.4 GHz Wi-Fi®, 2.4 GHz Bluetooth Classic®, 2.4 GHz BLE®, and 2.4 GHz IEEE 802.15.4). Differently stated, in configurations 302, 304, 306, and 308, the controller 170 may configure the first amplification circuit 150-1 to be in the transmission state 230 or the reception state 232 to transmit or receive the 5 GHz Wi-Fi® protocol.

FIG. 3-2 illustrates the configuration 302 of the front-end architecture 140 of FIG. 3-1. In the configuration 302, the controller 170 configures the first amplification circuit 150-1 to be in the transmission state 230 or the reception state 232, as described above. Additionally, the controller 170 configures the second amplification circuit 150-2 and the third amplification circuit 150-3 to be in the transmission state 230. By doing so, the configuration 302 enables simultaneous (e.g., concurrent or overlapping) transmission of the 2.4 GHz Wi-Fi® and the 2.4 GHz Bluetooth Classic® protocols, or simultaneous transmission of the 2.4 GHz Wi-Fi® and the 2.4 GHz BLE protocols, or simultaneous transmission of the 2.4 GHz Wi-Fi® and the IEEE 802.15.4 (e.g., Thread® or Zigbee®) protocols. It is to be appreciated that the multi-protocol transceiver system 132 simultaneously transmits the 2.4 GHz protocols without utilizing a PTA coexistence architecture (e.g., 3-wire PTA). In this manner, the configuration 302, as with all other configurations further described below, reduces the bottleneck in data transferring discussed in the Background section of this disclosure.

FIG. 3-3 illustrates the configuration 304 of the front-end architecture 140 of FIG. 3-1. In this configuration, the controller 170 configures the second amplification circuit 150-2 and the third amplification circuit 150-3 to be in the reception state 232. By doing so, the configuration 304 enables simultaneous reception of the 2.4 GHz Wi-Fi®, 2.4 GHz Bluetooth Classic®, 2.4 GHz BLE®, and IEEE 802.15.4 (e.g., Thread® or Zigbee®) protocols.

FIG. 3-4 illustrates the configuration 306 of the front-end architecture of FIG. 3-1. The controller 170 configures the second amplification circuit 150-2 to be in the transmission state 230 and the third amplification circuit 150-3 to be in the reception state 232. By doing so, the configuration 306 enables the multi-protocol transceiver system 132 to simultaneously transmit the 2.4 GHz Wi-Fi® protocol, while simultaneously receiving one or all of the 2.4 GHz Bluetooth Classic®, 2.4 GHz BLE®, and IEEE 802.15.4 (e.g., Thread® or Zigbee®) protocols.

Figures 3, 4, 5:
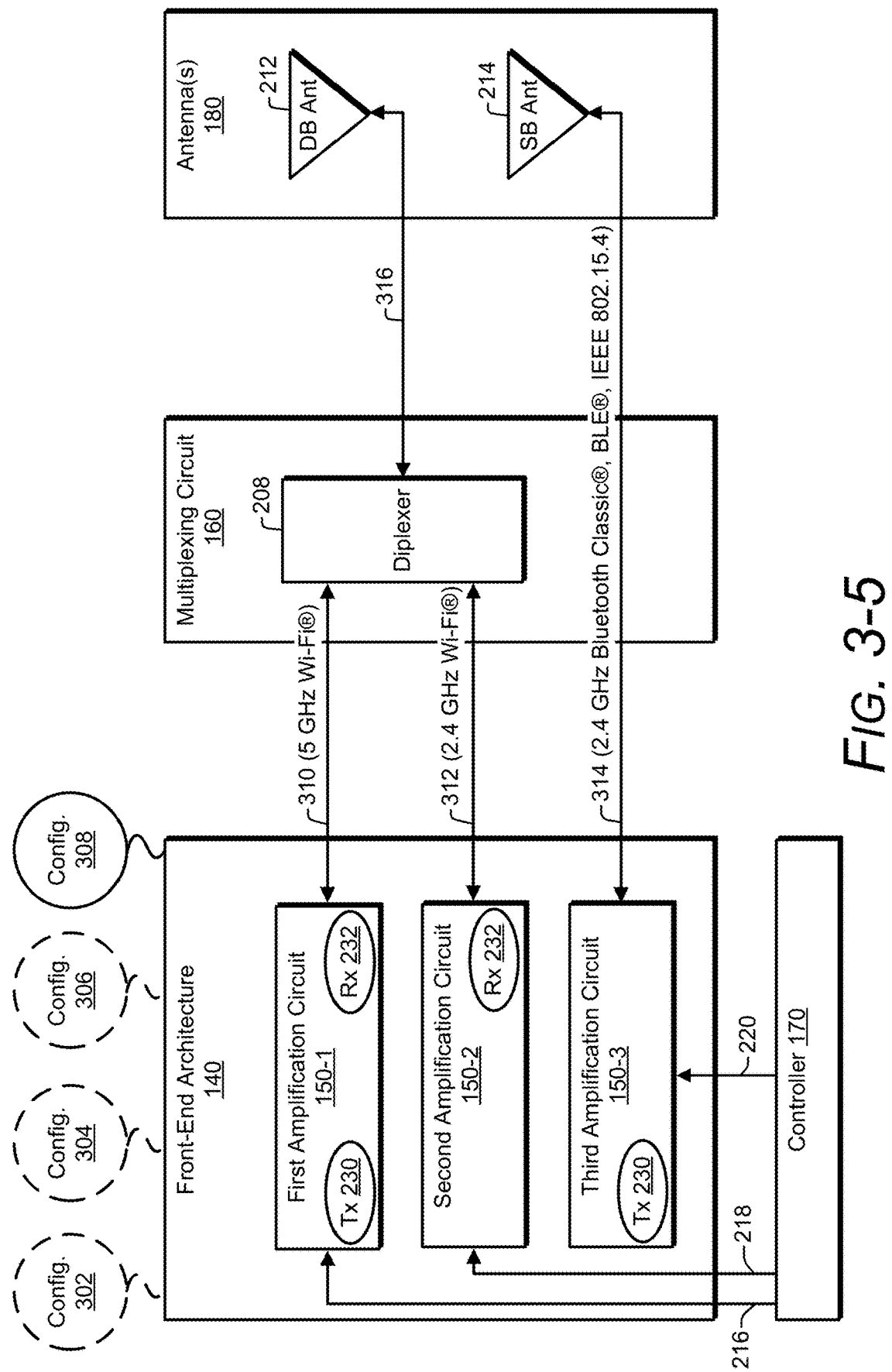
Figures 1, 4:
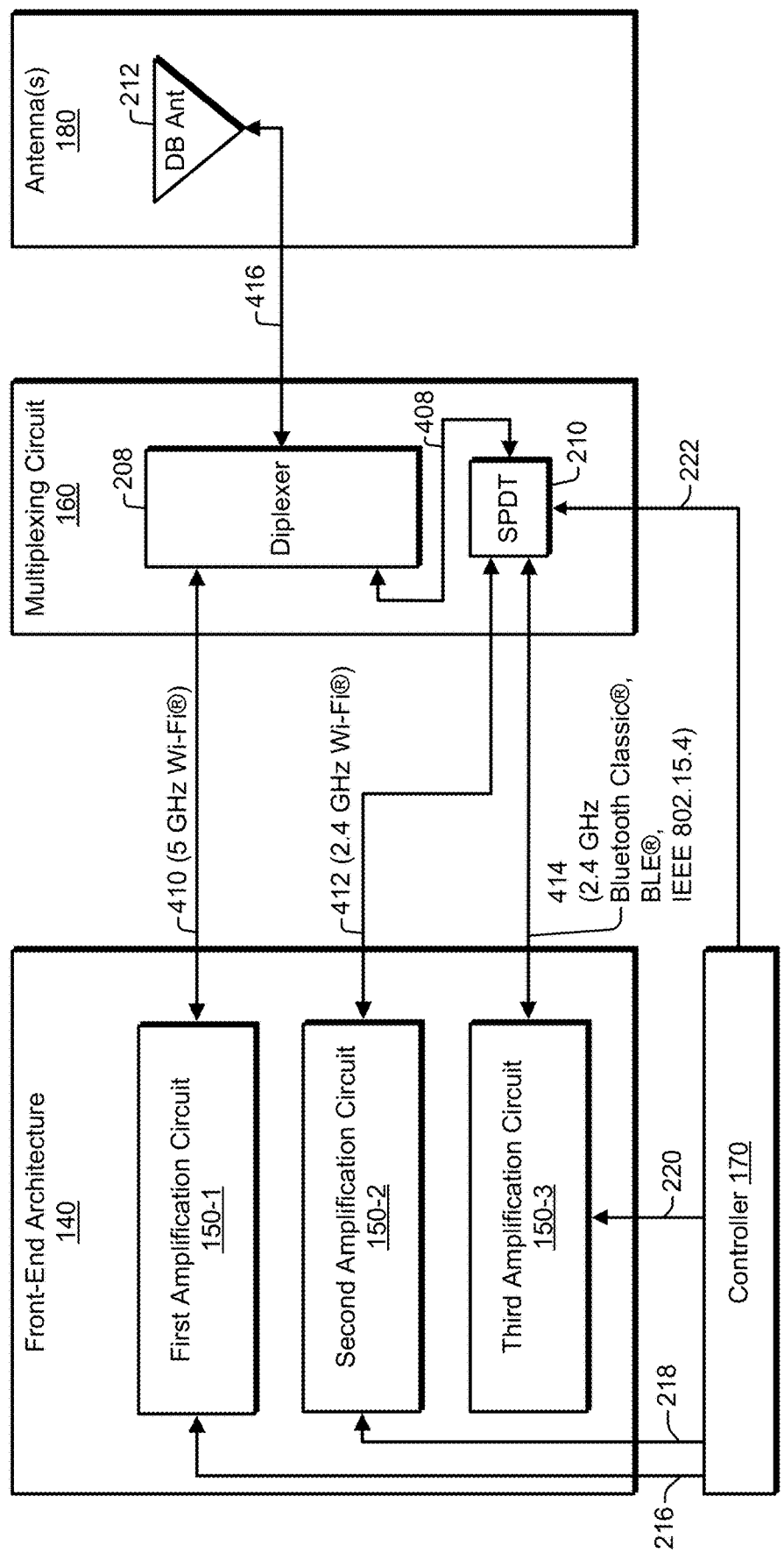
Figures 2, 4:
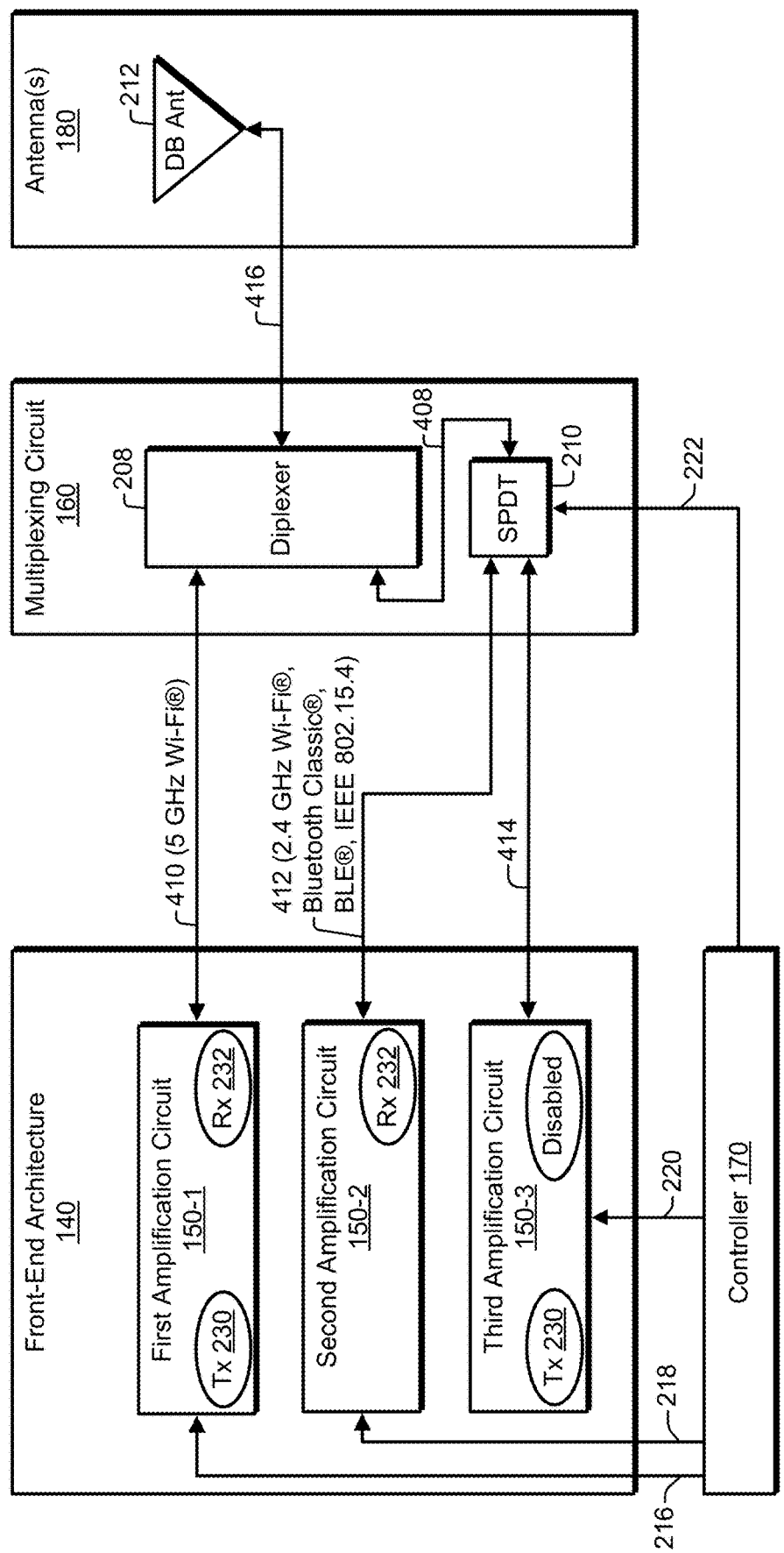
Figure 5:
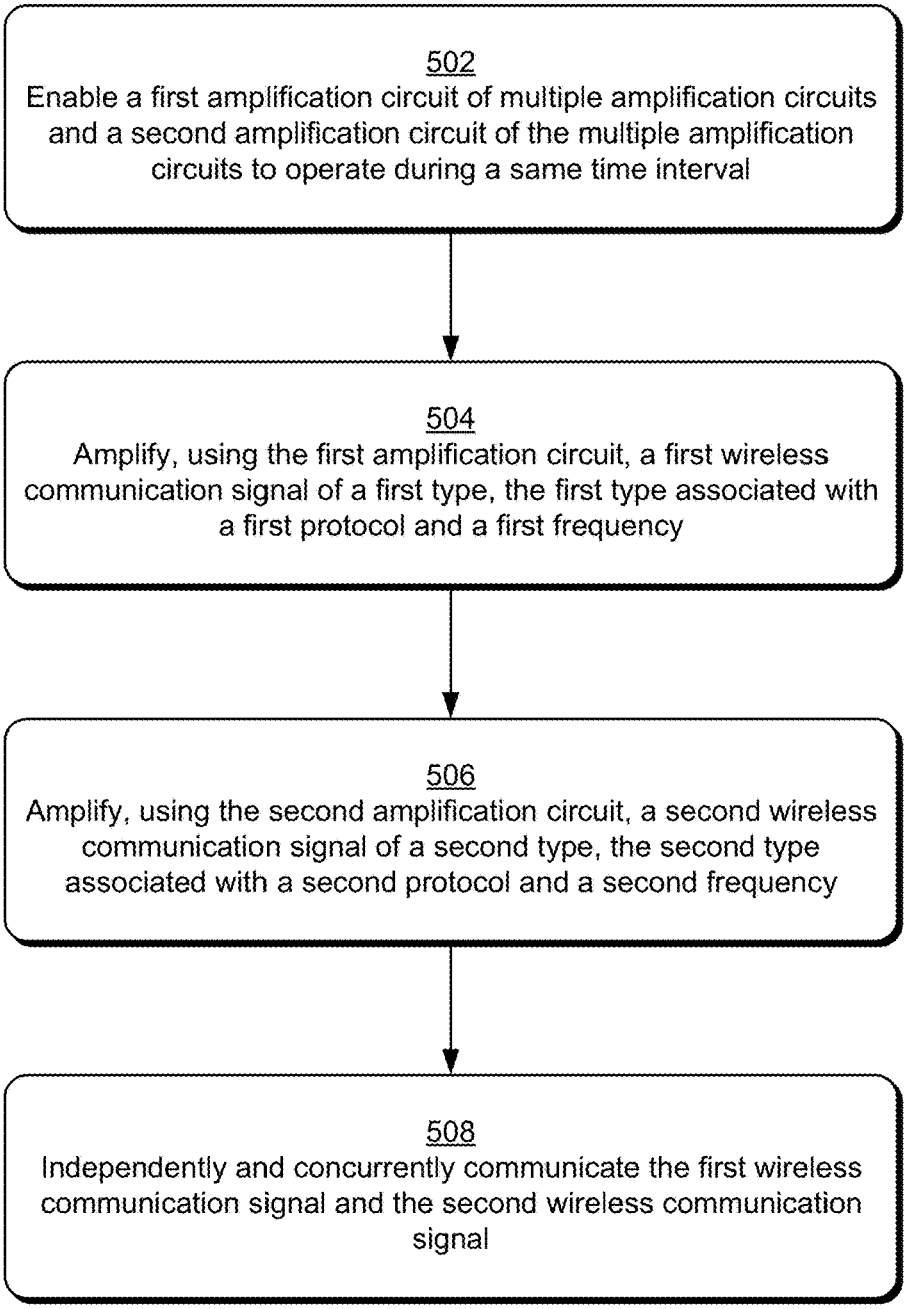

FIG. 3-5 illustrates the design configuration 308 of the front-end architecture of FIG. 3-1. The controller 170 configures the second amplification circuit 150-2 to be in the reception state 232 and the third amplification circuit 150-3 to be in the transmission state 230. By doing so, the configuration 308 enables the multi-protocol transceiver system 132 to simultaneously receive the 2.4 GHz Wi-Fi® protocol, while transmitting the 2.4 GHz Bluetooth Classic®, the 2.4 GHz BLE®, or the IEEE 802.15.4 (e.g., Thread® or Zigbee®) protocols. Differently stated, the configuration 308 enables the multi-protocol transceiver system 132 to receive the 2.4 GHz Wi-Fi® protocol, while transmitting the 2.4 GHz Bluetooth Classic® and the 2.4 GHz BLE® protocols. Alternatively, the configuration 308 enables the multi-protocol transceiver system 132 to receive the 2.4 GHz Wi-Fi® protocol, while transmitting the IEEE 802.15.4 (e.g., Thread® or Zigbee®) protocols.

It is worth noting that the configurations 302 (of FIG. 3-2), 304 (of FIG. 3-3), 306 (of FIGS. 3-4), and 308 (of FIG. 3-5) enable dynamic and selective transmission and/or reception of multiple protocols at the same time interval. As discussed in the Overview section, the conventional solutions that use the 3-wire PTA architecture do not allow for simultaneous transmission or reception of two protocols of the same frequency, such as 2.4 GHz Wi-Fi® and 2.4 GHz Bluetooth Classic®, or any similar combination thereof.

Example Single Antenna Implementation

FIG. 4-1 is an aspect of the front-end architecture 140 that supports transmission and reception of the multiple protocols between the front-end architecture 140 and one antenna (antenna(s) 180). The antenna 180 includes the dual-band antenna 212. In this design implementation, the antenna 180 does not include or utilize the single-band antenna 214. To enable the transmission and reception of the multiple protocols, the multiplexing circuit 160 includes the diplexer 208 and the SPDT 210.

As is illustrated in FIG. 4-1, the first amplification circuit 150-1 is coupled to the first terminal of the diplexer 208 via transmission and reception patch 410 and amplifies wireless communication signals associated with the 5 GHz Wi-Fi® protocol. The second amplification circuit 150-2 is coupled to a first terminal (throw) of the SPDT 210 via transmission and reception path 412 and amplifies (transmits and receives) wireless signals associated with the 2.4 GHz Wi-Fi® protocol. In a configuration depicted in FIG. 4-2, the second amplification circuit 150-2, via the transmission and reception path 412, can amplify and receive wireless signals according to 2.4 GHz Wi-Fi®, 2.4 GHz Bluetooth Classic®, 2.4 GHz BLE®, and/or 2.4 GHz IEEE 802.15.4 (e.g., Thread® or ZigBee®) protocols. Although not illustrated in FIG. 2, the LNA 204 of the second amplification circuit 150-2 can have two outputs coupled to the transceivers 136. As such, in the design implementation of FIG. 4-1 and FIG. 4-2, the LNA 204 of the second amplification circuit 150-3 can be shared or coupled to a first transceiver 136 that supports the 2.4 GHz Wi-Fi® protocol and a second transceiver 136 that supports the 2.4 GHz Wi-Fi®, 2.4 GHz Bluetooth Classic®, 2.4 GHz BLE®, and/or 2.4 GHz IEEE 802.15.4 (e.g., Thread® or ZigBee®) protocols.

The third amplification circuit 150-3 is coupled to a second terminal (throw) of the SPDT 210 via transmission path 414 and amplifies wireless communication signals associated with the 2.4 GHz Bluetooth Classic®, 2.4 GHz BLE®, and/or 2.4 GHz IEEE 802.15.4 (e.g., Thread® or ZigBee®) protocols. Then, a third terminal of the SPDT is coupled to the second terminal of the diplexer 208 utilizing transmission and reception path 408 to transmit and receive the 2.4 GHz Wi-Fi®, 2.4 GHz Bluetooth Classic®, 2.4 GHz BLE®, and/or 2.4 GHz IEEE 802.15.4 (e.g., Thread® or ZigBee®) protocols. Lastly, the third terminal of the diplexer 208 is coupled to the dual-band antenna 212 utilizing transmission and reception path 416 to transmit and receive the 5 GHz Wi-Fi® and the 2.4 GHz Wi-Fi® protocols (all protocols).

In FIGS. 3-1 to 3-4 the controller 170 utilizes three control signals (216, 218, and 220) to support all configurations when the multi-protocol transceiver system 132 utilizes two antennas (DB Ant 212 and SB Ant 214) for transmission and reception. In contrast, in FIGS. 4-1 and 4-2, the controller 170 utilizes four control signals (216, 218, 220, and 222) to support all configurations when the multi-protocol transceiver system 132 utilizes one antenna (DB Ant 212) for transmission and reception. Like the configurations illustrated in FIGS. 3-1 to 3-5, in FIGS. 4-1 and 4-2, regardless of the configuration of the front-end architecture 140, the controller 170 may configure the first amplification circuit 150-1 to be in the transmission state 230 or the reception state 232 to transmit or receive the 5 GHz Wi-Fi® protocol, without interfering with the 2.4 GHz protocols (e.g., 2.4 GHz Wi-Fi®, 2.4 GHz Bluetooth Classic®, 2.4 GHz BLE®, and 2.4 GHz IEEE 802.15.4). Using one dual-band antenna (DB Ant 212) to transmit and receive the above mentioned 5 GHz and the 2.4 GHz protocols, reduces the size, cost, and complexity of the user device 102, while utilizing the same multi-protocol transceiver system 132. However, unlike the configuration 302 discussed in FIG. 3-2, where the simultaneous transmission of various 2.4 GHz protocols is made possible by the utilization of two antennas (DB Ant 212 and SB Ant 214), the use of one antenna (DB Ant 212) in FIG. 4 limits the ability of the multi-protocol transceiver system 132 to simultaneously transmit the various 2.4 GHz protocols. Nevertheless, the multi-protocol transceiver system 132 of FIG. 4-1, with one antenna (DB Ant 212), can simultaneously receive multiple 2.4 GHz protocols without utilizing a PTA coexistence architecture (e.g., 3-wire PTA), as it is described in FIG. 4-2.

FIG. 4-2 illustrates a configuration of the multi-protocol transceiver system 132 of FIG. 4-1 that can simultaneously receive multiple 2.4 GHz protocols. To do so, the controller 170, using the control signal 218, configures the second amplification circuit 150-2 to be in the reception state 232. Also, using the control signal 220, the controller 170 disables the low-noise amplifier of the third amplification circuit 150-3 and enables a bypass mode of the power amplifier of the third amplification circuit 150-3, effectively creating an isolation state (illustrated as "Disabled") of the third amplification circuit 150-3. Lastly, using the control signal 222, the controller 170 enables the transmission and reception path 412. In this configuration, the low-noise amplifier 204 (the shared LNA) of the second amplification circuit 150-2 can simultaneously and independently amplify the reception of the 2.4 GHz Wi-Fi®, 2.4 GHz Bluetooth Classic®, 2.4 GHz BLE, and 2.4 GHz IEEE 802.15.4 protocols.

Example Methods

Figure 6:
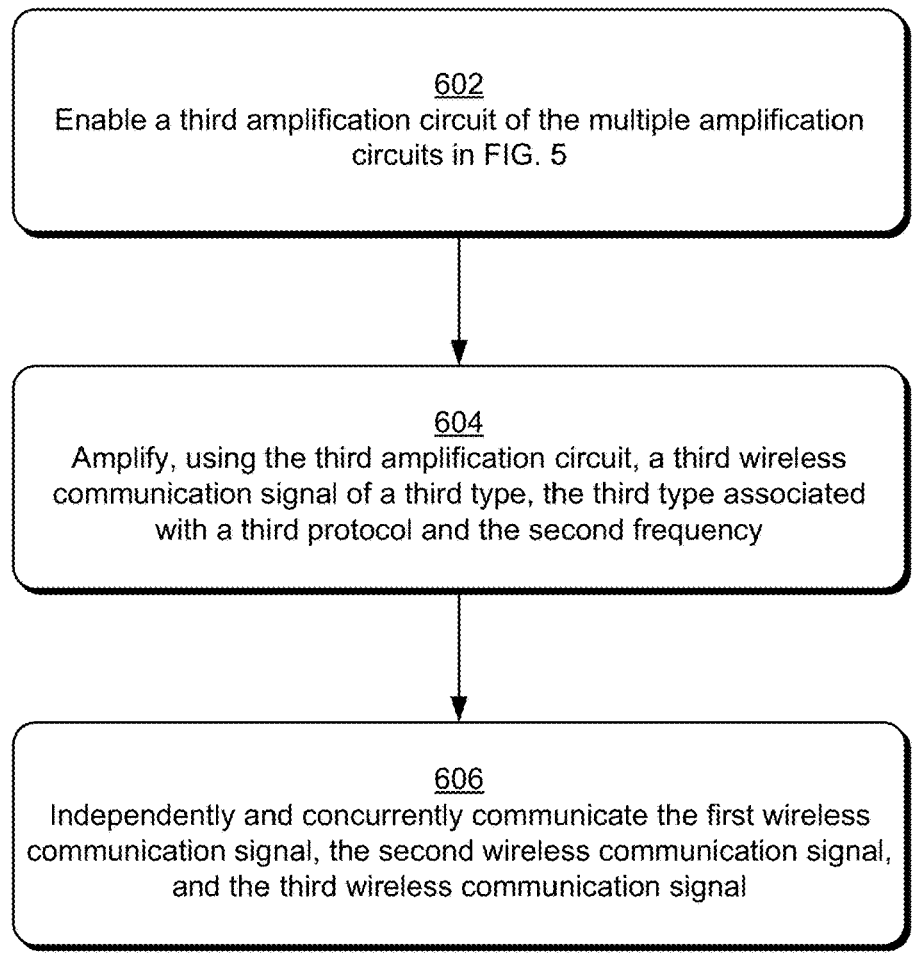
FIG. 6 illustrates an example method, performed by a device, for supporting multiple protocols with amplification via a third amplification circuit, in addition to the first and the second amplification circuits of FIG. 5.

FIG. 5 depicts an example method 500 for supporting multiple protocols with amplification via a first and a second amplification circuit. Methods described herein, such as method 500 illustrated in FIG. 5 or method 600 illustrated in FIG. 6, illustrate sets of operation (or acts) performed in, but not necessarily limited to, the order or combination in which the operations are described herein. Further, any of one or more of the operations of these methods may be repeated, combined, reorganized, skipped, or linked to provide a wide array of additional and/or alternate methods.

At 502, a device enables a first amplification circuit of multiple amplification circuits and a second amplification circuit of the multiple amplification circuits to operate during a same time interval. For example, the user device 102 enables, using the controller 170, the first amplification circuits 150-1 and the second amplification circuit 150-2 to operate during a same time interval, as described in FIGS. 3-1 to 4-2.

At 504, the device amplifies, using the first amplification circuit, a first wireless communication signal of a first type, the first type associated with a first protocol and a first frequency. For example, the user device 102 enables the first amplification circuit 150-1 to be in the transmission state 230 or the reception state 232 to transmit or receive the 5 GHz Wi-Fi® protocol.

At 506, the device amplifies, using the second amplification circuit, a second wireless communication signal of a second type, the second type associated with a second protocol and a second frequency. For example, the user device 102 enables the second amplification circuit 150-2 to be in the transmission state 230 or the reception state 232 to transmit or receive the 2.4 GHz Wi-Fi® protocol, as shown in FIGS. 3-2 to 3-5. Also, in some implementations (shown in FIG. 4-2), the device (e.g., user device 102) can enable the amplification circuit 150-2 to amplify additional types of protocols of the second frequency. In particular, FIG. 4-2 illustrates the user device 102 enabling the second amplification circuit 150-2 in the reception state 232 to receive the 2.4 GHz Wi-Fi®, 2.4 GHz Bluetooth Classic®, 2.4 GHz BLE, and 2.4 GHz IEEE 802.15.4 protocols.

At 508, the device independently and concurrently communicates the first wireless communication signal and the second wireless communication signal. Differently stated, in the stages 502 to 508, the device does not prioritize when to send the first wireless communication signal versus when to send the second wireless communication signal.

FIG. 6 depicts an example method 600 for supporting multiple protocols with amplification via a third amplification circuit, in addition to the first and the second amplification circuits of FIG. 5. At 602, the device enables the third amplification circuit. At 604, the device amplifies, using the third amplification circuit, a third wireless communication signal of a third type, the third type associated with a third protocol and the second frequency. For example, the third amplification circuit 150-3 amplifies wireless communication signals according to the 2.4 GHz Bluetooth Classic®, 2.4 GHz BLE, and 2.4 GHz IEEE 802.15.4 protocols. At 606, the device independently and concurrently communicates the first wireless communication signal, the second wireless communication signal, and the third wireless communication signal. For example, as shown in FIGS. 3-2 to 3-5, the user device 102 communicates the 5 GHz Wi-Fi® protocol, while independently and concurrently communicating the 2.4 GHz Wi-Fi® protocol. In addition, the user device 102 independently and concurrently communicates the 2.4 GHz Bluetooth Classic®, 2.4 GHz BLE, and 2.4 GHz IEEE 802.15.4 protocols, while communicating the 5 GHz Wi-Fi® and the 2.4 GHz Wi-Fi® protocols.

The following are additional examples of the described apparatuses, methods, and techniques for supporting multiple protocols with selective amplification Example 1: An apparatus comprising: multiple amplification circuits associated with different types of wireless communication signals having different protocols or different frequencies, each amplification circuit of the multiple amplification circuits configured to selectively: operate in a transmission state to amplify a particular type of wireless communication signal of the different types of wireless communication signals for transmission; or operate in a reception state to amplify the particular type of wireless communication signal for reception; and a controller configured to selectively enable two or more amplification circuits of the multiple amplification circuits to operate during a same time interval to enable independent and concurrent communication of two or more types of wireless communication signals of the different types of wireless communication signals.

Example 2: The apparatus of example 1, further comprising: one or more transceivers coupled to the multiple amplification circuits, the one or more transceivers configured to transmit and receive the different types of wireless communication signals, the one or more transceiver comprising multiple local oscillators, a quantity of the multiple local oscillators being equal to or greater than a quantity of the different protocols; and a multiplexing circuit coupled between the multiple amplification circuits and at least one transmission and reception path, the multiplexing circuit configured to selectively couple the two or more amplification circuits of the multiple amplification circuits to the at least one transmission and reception path, the at least one transmission and reception path configured to be coupled to at least one antenna.

Example 3: The apparatus of example 2, wherein: the multiple amplification circuits comprise a first amplification circuit and a second amplification circuit; and the multiplexing circuit comprises a diplexer having a first terminal, a second terminal, and a third terminal, the first terminal of the diplexer coupled to the first amplification circuit, the second terminal of the diplexer coupled to the second amplification circuit, the third terminal of the diplexer coupled to the at least one transmission and reception path, the at least one transmission and reception path configured to be coupled to a dual-band antenna of the at least one antenna.

Example 4: The apparatus of example 3, wherein: the controller is configured to: enable the first amplification circuit to operate in the transmission state or the reception state; and enable the second amplification circuit to operate in the reception state; and the multiplexing circuit is configured to couple the first and the second amplification circuits of the multiple amplification circuits to the transmission and reception path, the transmission and reception path configured to be coupled to the dual-band antenna of the at least one antenna.

Example 5: The apparatus of example 4, wherein: the multiple amplification circuits comprise a third amplification circuit; the multiplexing circuit comprises a switch having a first terminal, a second terminal, and a third terminal, the first terminal of the switch coupled to the second amplification circuit, the second terminal of the switch coupled to the third amplification circuit, and the third terminal of the switch coupled to the second terminal of the diplexer; and the controller is configured to disable the third amplification circuit responsive to enabling the second amplification circuit to operate in the reception state.

Example 6: The apparatus of example 4, wherein: the different protocols comprise: a first Wi-Fi® protocol of a first frequency; a second protocol of a second frequency, the second protocol comprising at least one of the following: a second Wi-Fi® protocol; a Bluetooth Classic® protocol; a Bluetooth Low Energy®, BLE®, protocol; or an Institute of Electrical and Electronics Engineers, IEEE, 802.15.4 protocol; the first amplification circuit is configured to provide amplification for the first Wi Fi® protocol; and the second amplification circuit is configured to provide amplification for the second protocol.

Example 7: The apparatus of example 3, wherein: the multiple amplification circuits comprise a third amplification circuit; and the multiplexing circuit is configured to connect the third amplification circuit to the at least one transmission and reception path, the at least one transmission and reception path configured to be coupled to a single-band antenna of the at least one antenna.

Example 8: The apparatus of example 7, wherein the controller is configured to: enable the first amplification circuit to operate in the transmission state or the reception state; and enables at least one of the following: the second amplification circuit to operate in the transmission state or the reception state; or the third amplification circuit to operate in the transmission state or the reception state.

Example 9: The apparatus of examples 1, 3, 7, or 8, wherein: the different protocols comprise: a first Wi-Fi® protocol of a first frequency; a second Wi-Fi® protocol of a second frequency; and a third protocol comprising at least one of the following: a Bluetooth Classic® protocol; a Bluetooth Low Energy®, BLE®, protocol; and an Institute of Electrical and Electronics Engineers, IEEE, 802.15.4 protocol; the first amplification circuit is configured to provide amplification for the first Wi Fi® protocol, the second amplification circuit is configured to provide amplification for the second Wi-Fi® protocol, and the third amplification circuit is configured to provide amplification for the third protocol.

Example 10: The apparatus of any of the preceding examples, wherein the apparatus is configured to direct transmission and reception of the different types of wireless communication signals without utilizing a packet traffic arbitration, PTA, coexistence architecture.

Example 11: The apparatus of any of the preceding examples, wherein each amplification circuit of the multiple amplification circuits comprises: at least one power amplifier; at least one low-noise amplifier; and at least one single-pole double-throw, SPDT, switch having a first throw coupled to the at least one power amplifier and a second throw coupled to the at least one low-noise amplifier.

Example 12: A method comprising: enabling a first amplification circuit of multiple amplification circuits and a second amplification circuit of the multiple amplification circuits to operate during a same time interval; amplifying, using the first amplification circuit, a first wireless communication signal of a first type, the first type associated with a first protocol and a first frequency; amplifying, using the second amplification circuit, a second wireless communication signal of a second type, the second type associated with a second protocol and a second frequency; and independently and concurrently communicating the first wireless communication signal and the second wireless communication signal.

Example 13: The method of example 12: the method further comprises amplifying, using a third amplification circuit of the multiple amplification circuits, a third wireless communication signal of a third type, the third type associated with a third protocol and the second frequency, wherein: the enabling comprises enabling a third amplification circuit of the multiple amplification circuits; and the independent and concurrent communicating comprises independently and concurrently communicating the first wireless communication signal, the second wireless communication signal, and the third wireless communication signal.

Example 14: The method of examples 12 or 13, wherein: the first frequency is the same as the second frequency and the first protocol is different than the second protocol; the first frequency is different than the second frequency and the first protocol is the same as the second protocol; or the first frequency is different than second frequency and the first protocol is different than the second protocol.

Example 15: The method of examples 12, 13, or 14, wherein the independent transmitting or receiving comprises: transmitting the first wireless communication signal and transmitting the second wireless communication signal concurrently; transmitting the first wireless communication signal and receiving the second wireless communication signal concurrently; receiving the first wireless communication signal and receiving the second wireless communication signal concurrently; or receiving the first wireless communication signal and transmitting the second wireless communication signal concurrently.

Example 16: A system comprising: one or more transceivers; a multiplexing circuit; multiple amplification circuits; and a controller configured to selectively enable two or more amplification circuits of the multiple amplification circuits to perform the operations of any of examples 12 to 15.

CONCLUSION

Although implementations of techniques for, and apparatuses supporting, multiple protocols with selective amplification have been described in language specific to features and/or methods, it is to be understood that the subject of the appended claims is not necessarily limited to the specific features or methods described. Rather, the specific features and methods are disclosed as example implementations supporting multiple protocols with selective amplification.

What is claimed:

1. An apparatus comprising:
multiple amplification circuits associated with different types of wireless communication signals having different protocols or different frequencies, each amplification circuit of the multiple amplification circuits configured to selectively:
    operate in a transmission state to amplify a particular type of wireless communication signal of the different types of wireless communication signals for transmission; or
    operate in a reception state to amplify the particular type of wireless communication signal for reception;
a controller configured to selectively enable two or more amplification circuits of the multiple amplification circuits to operate during a same time interval to enable independent and concurrent communication of two or more types of wireless communication signals of the different types of wireless communication signals; and
a multiplexing circuit coupled between the multiple amplification circuits and transmission and reception path, the multiplexing circuit configured to selectively couple the two or more amplification circuits of the multiple amplification circuits to the transmission and reception path, the transmission and reception path configured to be coupled to at least one antenna, the multiple amplification circuits comprising a first amplification circuit and a second amplification circuit, and the multiplexing circuit comprising a diplexer having a first terminal, a second terminal, and a third terminal, the first terminal of the diplexer coupled to the first amplification circuit, the second terminal of the diplexer coupled to the second amplification circuit, the third terminal of the diplexer coupled to the transmission and reception path;
the controller being configured to:
    enable the first amplification circuit to operate in the transmission state or the reception state; and
    enable the second amplification circuit to operate in the reception state; and
the multiplexing circuit being configured to couple the first and the second amplification circuits of the multiple amplification circuits to the transmission and reception path, the transmission and reception path configured to be coupled to a dual-band antenna of the at least one antenna;
the multiple amplification circuits comprising a third amplification circuit;
the multiplexing circuit comprising a switch having a first terminal, a second terminal, and a third terminal, the first terminal of the switch coupled to the second amplification circuit, the second terminal of the switch coupled to the third amplification circuit, and the third terminal of the switch coupled to the second terminal of the diplexer; and
the controller being configured to disable the third amplification circuit responsive to enabling the second amplification circuit to operate in the reception state.

2. The apparatus of claim 1, further comprising:
one or more transceivers coupled to the multiple amplification circuits, the one or more transceivers configured to transmit and receive the different types of wireless communication signals, the one or more transceiver comprising multiple local oscillators, a quantity of the multiple local oscillators being equal to or greater than a quantity of the different protocols.

3. The apparatus of claim 1, wherein:
the different protocols comprise:
a first Wi-Fi® protocol of a first frequency;
a second protocol of a second frequency, the second protocol comprising at least one of the following:
    a second Wi-Fi® protocol;
    a Bluetooth Classic® protocol;
    a Bluetooth Low Energy® (BLE®) protocol; or
    an Institute of Electrical and Electronics Engineers (IEEE) 802.15.4 protocol;
    the first amplification circuit is configured to provide amplification for the first Wi Fi® protocol; and
the second amplification circuit is configured to provide amplification for the second protocol.

4. The apparatus of claim 1, wherein:
the multiple amplification circuits comprise a third amplification circuit; and
the multiplexing circuit is configured to connect the third amplification circuit to the transmission and reception path, the transmission and reception path configured to be coupled to a single-band antenna of the at least one antenna.

5. The apparatus of claim 4, wherein the controller is configured to:
enable the first amplification circuit to operate in the transmission state or the reception state; and
enables at least one of the following:
    the second amplification circuit to operate in the transmission state or the reception state; or
    the third amplification circuit to operate in the transmission state or the reception state.

6. The apparatus of claim 1, wherein:
the different protocols comprise:
a first Wi-Fi® protocol of a first frequency;
a second Wi-Fi® protocol of a second frequency; and
a third protocol comprising at least one of the following:
    a Bluetooth Classic® protocol;
    a Bluetooth Low Energy® (BLE®) protocol; and
    an Institute of Electrical and Electronics Engineers (IEEE) 802.15.4 protocol; and
the first amplification circuit is configured to provide amplification for the first Wi Fi® protocol, the second amplification circuit is configured to provide amplification for the second Wi-Fi® protocol, and the third amplification circuit is configured to provide amplification for the third protocol.

7. The apparatus of claim 1, wherein the apparatus is configured to direct transmission and reception of the different types of wireless communication signals without utilizing a packet traffic arbitration (PTA) coexistence architecture.

8. The apparatus of claim 1, wherein each amplification circuit of the multiple amplification circuits comprises:
at least one power amplifier;
at least one low-noise amplifier; and at least one single-pole double-throw (SPDT) switch having a first throw coupled to the at least one power amplifier and a second throw coupled to the at least one low-noise amplifier.

9. A method comprising:
enabling a first amplification circuit of multiple amplification circuits and a second amplification circuit of the multiple amplification circuits to operate during a same time interval;
amplifying, using the first amplification circuit, a first wireless communication signal of a first type, the first type associated with a first protocol and a first frequency;
amplifying, using the second amplification circuit, a second wireless communication signal of a second type, the second type associated with a second protocol and a second frequency;
independently and concurrently communicating the first wireless communication signal and the second wireless communication signal;
amplifying, using a third amplification circuit of the multiple amplification circuits, a third wireless communication signal of a third type, the third type associated with a third protocol and the second frequency, the enabling comprising enabling a third amplification circuit of the multiple amplification circuits;
selectively coupling, by a multiplexing circuit coupled between the first, second and third amplification circuits and a transmission and reception path, the first, second and third amplification circuits to the transmission and reception path;
enabling, by a controller, the first amplification circuit to operate in the transmission state or the reception state;
coupling, by the multiplexing circuit, the first and the second amplification circuits to the transmission and reception path;
coupling the transmission and reception path to a dual-band antenna; and
disabling, by the controller, the third amplification circuit responsive to enabling the second amplification circuit to operate in the reception state.

10. The method of claim 9, wherein:
the first frequency is the same as the second frequency and the first protocol is different than the second protocol;
the first frequency is different than the second frequency and the first protocol is the same as the second protocol; or
the first frequency is different than second frequency and the first protocol is different than the second protocol.

11. The method of claim 9, wherein the independent transmitting or receiving comprises:
transmitting the first wireless communication signal and transmitting the second wireless communication signal concurrently;
transmitting the first wireless communication signal and receiving the second wireless communication signal concurrently;
receiving the first wireless communication signal and receiving the second wireless communication signal concurrently; or
receiving the first wireless communication signal and transmitting the second wireless communication signal concurrently.

12. A system comprising:
one or more transceivers;
a multiplexing circuit;
multiple amplification circuits; and
a controller configured to selectively enable two or more amplification circuits of the multiple amplification circuits to configure the system to:
enable a first amplification circuit of the multiple amplification circuits and a second amplification circuit of the multiple amplification circuits to operate during a same time interval;
amplify, using the first amplification circuit, a first wireless communication signal of a first type, the first type associated with a first protocol and a first frequency;
amplify, using the second amplification circuit, a second wireless communication signal of a second type, the second type associated with a second protocol and a second frequency;
independently and concurrently communicate the first wireless communication signal and the second wireless communication signal
amplify, using a third amplification circuit of the multiple amplification circuits, a third wireless communication signal of a third type, the third type associated with a third protocol and the second frequency, the enabling comprising enabling a third amplification circuit of the multiple amplification circuits;
selectively couple, by a multiplexing circuit coupled between the first, second and third amplification circuits and a transmission and reception path, the first, second and third amplification circuits to the transmission and reception path;
enable, by a controller, the first amplification circuit to operate in a transmission state or a reception state;
couple, by the multiplexing circuit, the first and the second amplification circuits to the transmission and reception path;
couple the transmission and reception path to a dual-band antenna; and
disable, by the controller, the third amplification circuit responsive to enabling the second amplification circuit to operate in the reception state.

13. The system of claim 12, wherein:
the first frequency is the same as the second frequency and the first protocol is different than the second protocol;
the first frequency is different than the second frequency and the first protocol is the same as the second protocol; or
the first frequency is different than second frequency and the first protocol is different than the second protocol.

14. The system of claim 12, wherein the independent communication configures the system to:
transmit the first wireless communication signal and transmitting the second wireless communication signal concurrently;
transmit the first wireless communication signal and receiving the second wireless communication signal concurrently;
receive the first wireless communication signal and receiving the second wireless communication signal concurrently; or
receive the first wireless communication signal and transmitting the second wireless communication signal concurrently.

15. The system of claim 12, wherein the first protocol comprises a first Wi-Fi® protocol of the first frequency, and wherein the second protocol comprises at least one of the following:
a second Wi-Fi® protocol;
a Bluetooth Classic® protocol;

a Bluetooth Low Energy® (BLE®) protocol; or
an Institute of Electrical and Electronics Engineers (IEEE) 802.15.4 protocol.

\* \* \* \* \*